United States Patent [19]

King

[11] Patent Number: 4,967,647

[45] Date of Patent: Nov. 6, 1990

[54] AIR SUPPLY FOR A COFFEE MAKER

[76] Inventor: Alan M. King, 465 Cote St. Antoine Rd., Westmount, Quebec, Canada, H3Y 2K1

[21] Appl. No.: 402,470

[22] Filed: Sep. 5, 1989

[51] Int. Cl.⁵ .................... A47J 31/32; A47J 31/36
[52] U.S. Cl. .................................... 99/280; 99/287
[58] Field of Search ............. 99/279, 280, 287, 289 R, 99/289 T, 297, 300, 302 R, 302 P, 305, 316, 318, 320; 426/433

[56] References Cited

U.S. PATENT DOCUMENTS

| | | | |
|---|---|---|---|
| 3,478,670 | 11/1969 | Fuqua | 99/302 R |
| 4,823,685 | 4/1989 | Boumans | 99/287 |

*Primary Examiner*—Robert W. Jenkins
*Attorney, Agent, or Firm*—Hill, Van Santen, Steadman & Simpson

[57] ABSTRACT

An improved beverage machine such as a coffee maker in which air is injected from a suitable air supply so as to agitate the coffee and water mixture as the coffee is brewed so as to increase the amount of coffee that is extracted. Various embodiments are disclosed wherein the air is injected at different times in the brewing cycle for different brewing structures.

8 Claims, 2 Drawing Sheets

U.S. Patent   Nov. 6, 1990   Sheet 2 of 2   4,967,647
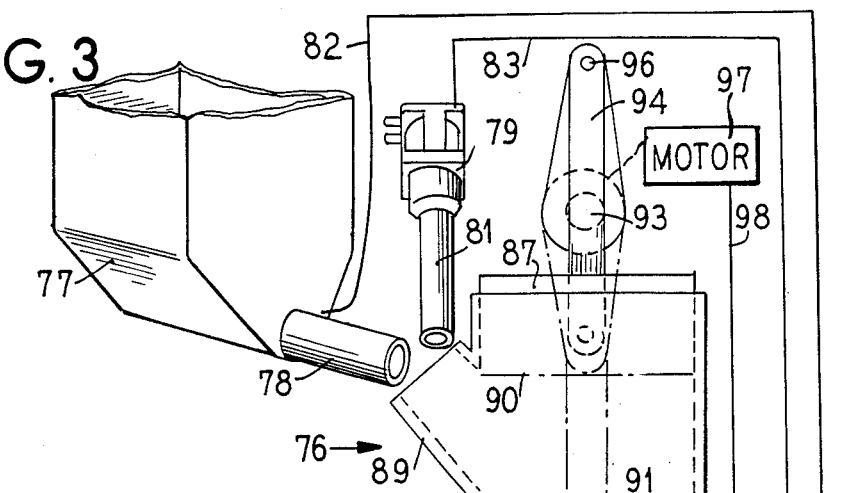
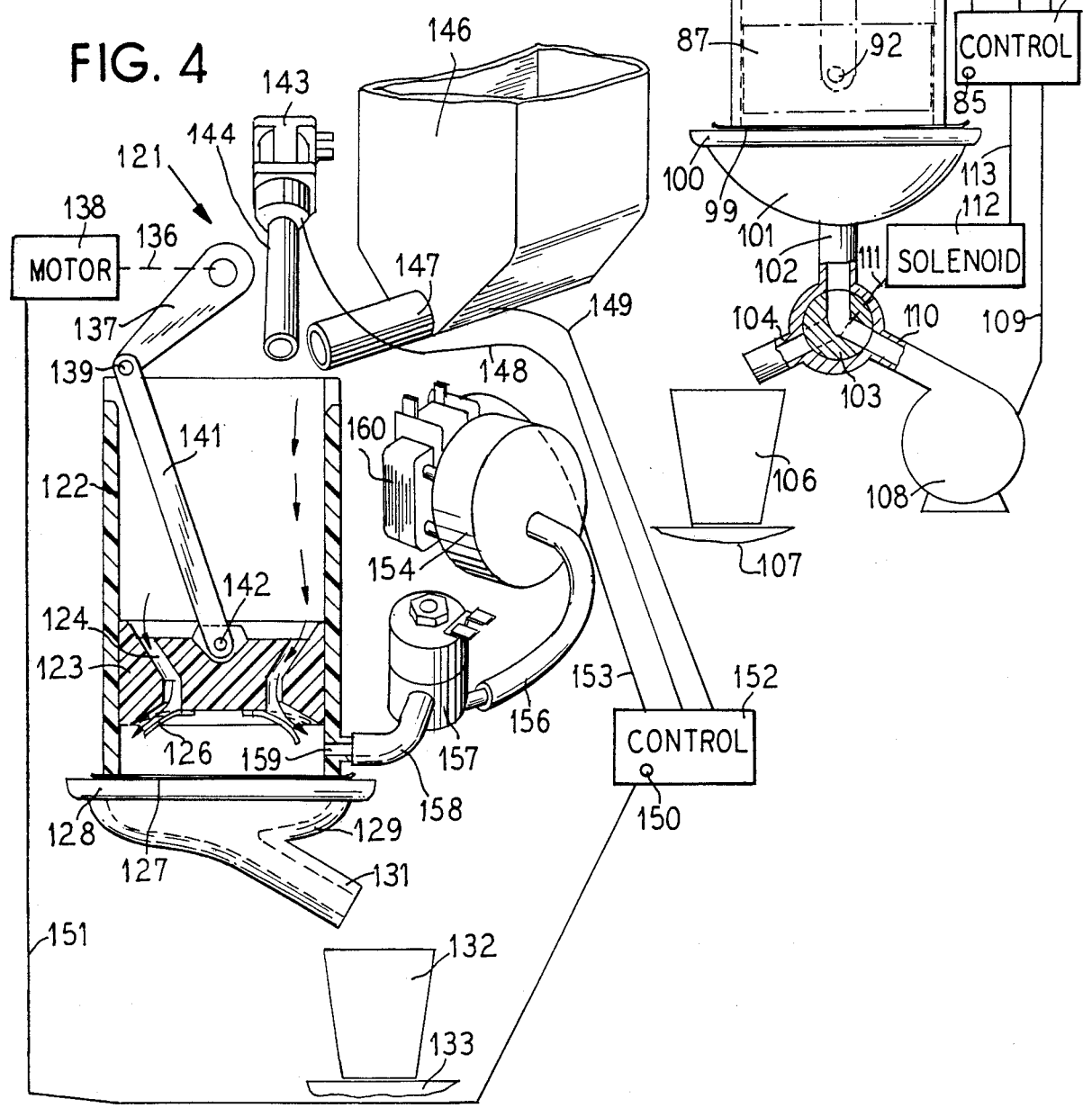

4,967,647

AIR SUPPLY FOR A COFFEE MAKER

BACKGROUND OF THE INVENTION

1. Field of the Invention

This invention relates in general to beverage brewers and in particular to a novel coffee brewer in which air is injected in the brewing cycle.

2. Description of the Related Art

The inventor of the present application has obtained a number of patents such as U.S. Pat. No. 4,796,859 entitled "Coffee Brewer" which issued on Dec. 20, 1988 and U.S. Pat. No. 4,632,023 entitled "Coffee Brewer" which issued on Dec. 30, 1986 and U.S. Pat. No. 4,193,321 entitled "Cam Arrangement" which issued on Mar. 18, 1980 and U.S. Pat. No. 4,736,875 entitled "Timing Mechanism" which issued on Apr. 12, 1988. These prior art coffee brewers have upper and lower chambers separated by a filter and with a moveable piston which agitates and forces the coffee water mixture through the filter as the coffee is brewed.

SUMMARY OF THE INVENTION

The present invention provides an improvement on such prior art coffee brewers wherein air is injected into the brewer during the brewing cycle so as to increase the agitation thus resulting in more efficient brewing during the brewing cycle.

It is a feature of the present invention that air is injected into a coffee brewer to increase the agitation between the coffee and the water.

In one embodiment, at the same time as the ground coffee is deposited from a dispenser into an upper brewing chamber, hot water is admitted into the upper brewing chamber and this mixture is agitated by the action of a moveable piston which moves upward in a lower chamber and wherein added air pressure from an air pump is injected to increase the agitation.

Other embodiments provide for the injection of air at different times in the brewing cycle.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 3 is a plan view illustrating a modified form of the invention; and

FIG. 4 is a partially sectional view illustrating a further modification of the invention.

DESCRIPTION OF THE PREFERRED EMBODIMENTS

Figure 1:
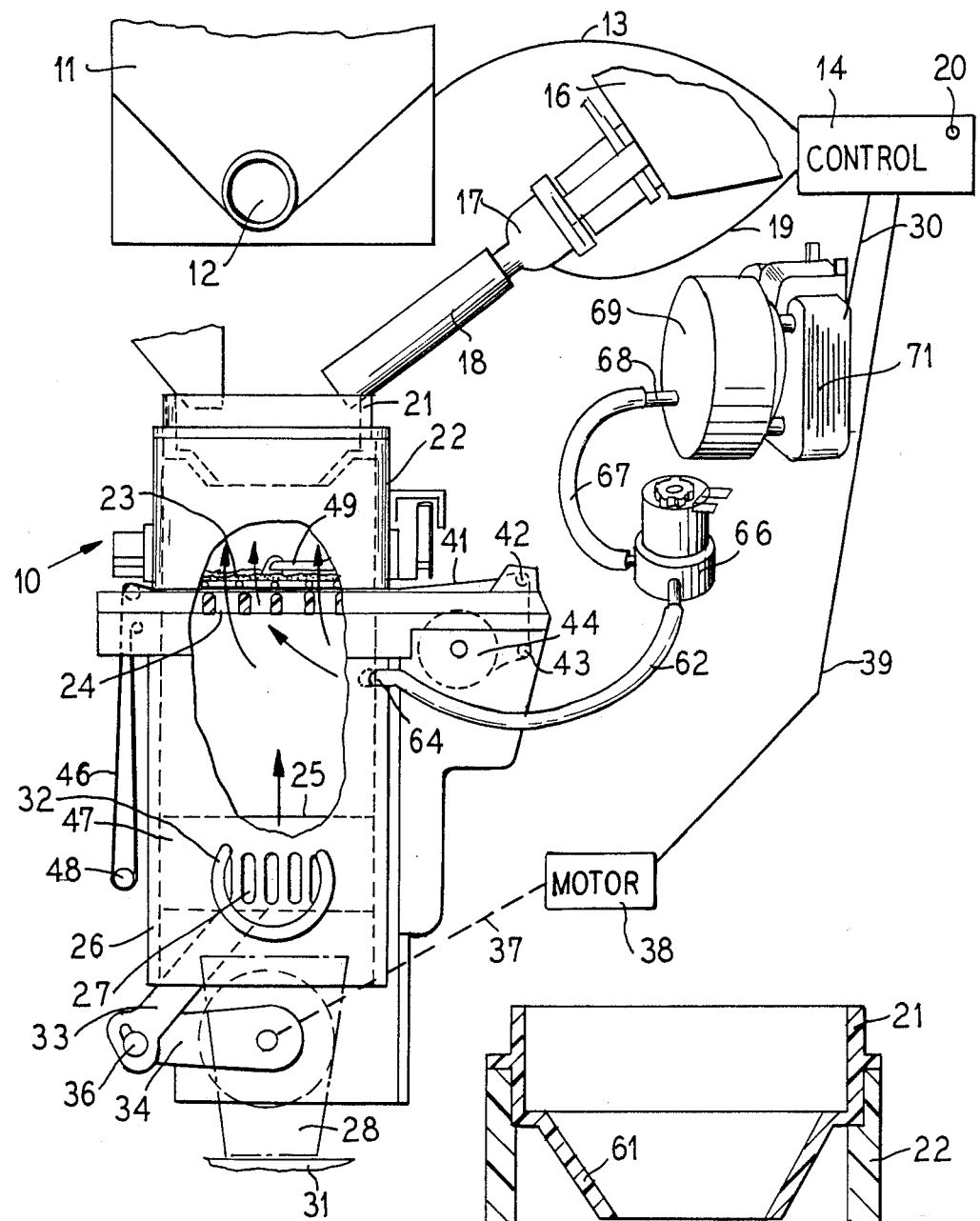
FIG. 1 is a partially cut-away plan view illustrating the coffee brewer according to the invention.
Figure 2:
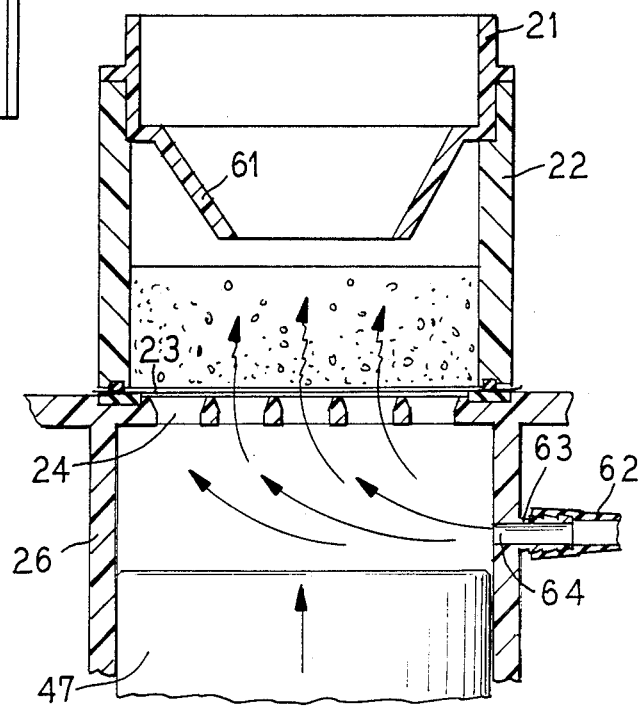
FIG. 2 is a sectional view of the upper brewing chamber and a portion of the lower brewing chamber.

FIGS. 1 and 2 illustrate a first embodiment of the invention comprising coffee brewer 10 which has a coffee reservoir 11 with a coffee discharge opening 12 for discharging coffee into a funnel 21 of an upper brewing chamber 22. A water reservoir 16 dispenses hot water through a valve 17 and a pipe 18 into the funnel 21 during the brewing cycle. A porous separator 24 is provided with a filter 23 and a hold-down mechanism 49. The filter 23 is supplied from a filter supply 44 which passes over rollers 43 and 42 to a filter portion 41 outside the coffee brewer. Filter portion passes around a weight 48 and portion 46 is connected to the filter 23 as disclosed in the above-referenced prior art patents.

A piston 47 is moveably mounted in the lower brewing chamber 26 and is driven by a motor 38 which has an output shaft 37 which is connected to a link 34 pivotally connected to a link 33 by pivot pin 36 which is pivotally connected to the piston 47. Openings 27 are formed in the lower brewing chamber 26 and a chute 32 discharges brewed coffee into a cup 28 which is mounted on a base 31. A motor 71 is connected to drive an air pump 69 which has an output conduit 68 connected to a flexible conduit 67 that supplies air into a regulator 66. The regulator supplies output air through a conduit 62 to a coupling 63 best shown in FIG. 2 which has an opening 64 which discharges air into the lower brewing chamber 26 as shown in FIGS. 2 and 1. A control 14 may be provided with an actuator button 20 and has a first control lead 13 which is connected to the coffee dispenser comprising the reservoir 11 and discharge chute 12. The control 14 has a second control lead 19 which is connected to control the valve 17. The control 14 is connected to a lead 30 which controls the motor 71 to drive the pump 69. A lead 39 is connected to the motor 38 to control operation of the motor 38.

In operation, when the control button 20 is energized the control 14 causes ground coffee to be discharged through the opening 12 into the funnel 21 and simultaneously hot water is discharged from the reservoir 16 through valve 17 and pipe 18 into the funnel 21 under command of the control 14. The motor 38 is energized by the control 14 to cause the piston 47 to move upwardly in the lower brewing chamber 26 and simultaneously the motor 71 is energized by the control 14 to cause the motor 71 to actuate the pump 69 to inject air through the opening 64 into the lower brewing chamber which increases the agitation of the coffee and hot water so as to increase the efficiency of brewing. The piston 47 moves upwardly in the lower chamber 26 until it is at top dead center and then starts downwardly in the lower chamber 26 causing suction to suck the coffee through the filter 23 into the lower brewing chamber 26. As the upper end 25 of the piston 47 passes below the openings 27 in the lower chamber, the brewed coffee will pass through the chute 32 into the cup 28. The air from the pump 69 may be injected into the lower brewing chamber as the piston 47 moves upwardly in the lower brewing chamber and also as it moves downwardly to increase the brewing efficiency.

FIG. 3 illustrates the modified form of the invention wherein a coffee reservoir 77 supplies coffee from a chute 78 into an opening 89 of a brewing chamber 86. Hot water is also supplied through valve 79 and conduit 81 into the inlet 89. A piston 87 is mounted in the brewing chamber 86 and is connected by wrist pin 92 to link 91 which is connected to link 94 which is driven by the output shaft 93 of a motor 97. A filter 99 is supported by a porous filter support 100 and a lower chamber 101 receives the brewed coffee and supplies it to a conduit 102. A two-way valve 103 is controlled by a shaft 111 of a solenoid 112. An air pump 108 has its output 110 connected to the valve 103. A conduit 104 is connected to the valve 103 and supplies coffee to a cup 106 supported on a base 108. A control 84 with an actuating button 85 is connected by a lead 109 to the air pump 108. The control 84 is connected by a lead 113 to the solenoid 112 to energize it. Control 84 is connected by lead 98 to the motor 97 to control it. Control 84 is connected by lead 83 to the hot water valve 79. The control 84 is connected by lead 82 to the coffee reservoir 77 to energize it.

In operation, the piston 87 is in the top position of the brewing chamber 86 above the entrance opening 89 and when the actuator button 85 of the control 84 is energized, coffee from the coffee reservoir and chute 78 is dispensed into the opening 89 and simultaneously water is dispensed through the valve 79 and the conduit 81 into the brewing chamber below the piston 87. The valve 103 is in the position shown in FIG. 3 so that the air pump 108 can be energized to supply air through the conduit 110 up through the conduit 102 and chamber 101 and through the filter 99 into the brewing chamber 86 to agitate the coffee and water mixture. The motor 97 is also energized at this time which causes the piston 87 to move downwardly and just before it closes off the opening 89 in its downward path, the air pump 108 is turned off and the solenoid 112 is energized to move the valve 103 so that the conduit 102 is connected to the conduit 104 so that the brewed coffee can pass through the filter 99 and chamber 101 into the coffee cup 106. The valve 103 is left in the discharge position into cup 106 until the water and coffee enter the cylinder for the next cup to be brewed at which time the pump 108 is turned on. Before the motor 97 stops, it continues so that the piston 87 passes beyond full down dead center and returns to the full up position wherein the lower edge 90 of the piston 87 is above the inlet opening 89.

FIG. 4 illustrates another embodiment of the invention wherein the coffee brewer 121 comprises a brewing chamber 122 in which is moveably mounted a piston 123 which is formed with openings 124 from the top surface of the piston to the lower surface and wherein one-way valves 126 close the openings in the piston so that liquid can pass down through the openings 124, but cannot pass up through the openings 124 due to the valves 126. A filter 127 is supported on a porous filter support 128 at the bottom of the brewing chamber 122 and a collecting chamber 129 is below the filter support 128 and has an outlet conduit 131 which supplies coffee into a cup 132 that can be placed on a base 133. The coffee reservoir 146 has a discharge tube 147 for discharging coffee into the brewing chamber 122 and hot water valve 143 and conduit 144 discharges hot water into the brewing chamber 122. A motor 160 drives an air pump 154 which supplies air through a conduit 156 to a regulator 157 which has an output conduit 158 that is connected to a passage 159 which supplies air from the pump 154 into the lower portion of the brewing chamber 122 below the piston 123. The motor 138 has an output shaft 136 which drives a link 137 that is connected by pin 139 to a link 141 which is connected by a pin 142 to the piston 123 so as to move it up and down in the brewing chamber 122 as the motor 138 is energized. The control 152 has an actuating button 150 and the control 152 is connected by a lead 151 to the motor 138. The control 152 is connected by a lead 153 to the motor 160. The control 152 is connected to the coffee dispenser by a lead 149 to control it. Control 152 is connected by lead 148 to the valve 143 to control it.

In operation, the piston 123 is initially in the lower portion of the brewing chamber 122 and when the control button 158 is energized, the control 152 dispenses coffee from the chute 147 and water from the pipe 144 into the brewing chamber 122 which passes through the opening 124 into the brewing chamber 122 below the piston 123. Simultaneously, the motor 160 is energized by the control 152 to energize the pump 154 to inject air through the opening 159 to agitate the coffee and water mixture below the cylinder 123. Simultaneously, the motor 138 is energized to cause the piston 123 to move upwardly from the position shown in FIG. 4 and as it moves upwardly, the air entering the opening 159 agitates the coffee and water mixture. The motor 138 continues to move the piston 123 over top dead center and then drives the piston downwardly so as to force the coffee through the filter 127 and out the chute 131 into the cup 132. The cylinder 123 stops in the position shown in FIG. 4 until the next cycle. The air supply from pump 154 is turned off until the next cup is to be dispensed.

It is seen that this invention provides new and novel coffee maker in which air is injected during the brewing cycle to increase the agitation and increase the brewing efficiency.

Although the invention has been described with respect to preferred embodiments, it is not to be so limited as changed and modifications can be made therein which are within the full intended scope of the invention as defined by the appended claims.

I claim as my invention:

1. A beverage dispenser, comprising a brewing chamber for brewing a beverage, a control means which controls a brewing cycle, and means for injecting air into said brewing chamber controlled by said control means so as to improve the efficiency of the brewing cycle, and wherein said brewing chamber has an upper brewing chamber and a lower brewing chamber with a brewed coffee outlet, and a porous separator and filter between said upper and lower brewing chambers, means for dispensing coffee and hot water into said upper brewing chamber, a piston moveably mounted in said lower brewing chamber, driving means connected to said control means and connected to said piston to move it, and said means for injecting air into said brewing chamber connected so as to inject air into said lower brewing chamber.

2. A beverage dispenser according to claim 1 wherein said means for injecting air comprises an inlet into said lower brewing chamber and an air supply connected to said inlet.

3. A beverage dispenser according to claim 2 wherein said air supply comprises an air pump connected to said inlet and a motor connected to said air pump and said control means connected to said motor.

4. A beverage dispenser according to claim 3 including a coffee outlet formed in a lower portion of said lower brewing chamber.

5. A beverage dispenser, comprising a brewing chamber for brewing a beverage, a control means which controls a brewing cycle, and means for injecting air into said brewing chamber controlled by said control means so as to improve the efficiency of the brewing cycle, and including a piston moveably mounted in said brewing chamber, driving means connected to said control means and connected to said piston, an opening formed in said brewing chamber at a position between the highest and lowest points between which said piston moves, means for dispensing coffee and hot water into said brewing chamber through said opening, a porous separator and filter extending across a lower portion of said brewing chamber, a collection chamber attached to said brewing chamber below said porous separator and said filter and said means for injecting air into said brewing chamber injecting air into said collection chamber.

6. A beverage dispenser according to claim 5 including a two-way valve connected to said collection chamber moveable to a first position to allow said means for injecting air to inject air into said collection chamber, and moveable to a second position to allow coffee to pass from said collection chamber to a beverage holder.

7. A beverage dispenser according to claim 6 wherein said control means is connected to said valve means to move it between said first and second positions.

8. A beverage dispenser, comprising a brewing chamber for brewing a beverage, a control means which controls a brewing cycle, and means for injecting air into said brewing chamber controlled by said control means so as to improve the efficiency of the brewing cycle, and including a piston moveably mounted in said brewing chamber, driving means connected to said control means and connected to said piston, an opening formed through said piston from the top to bottom thereof, a one-way valve mounted in said opening to allow coffee and hot water to pass downwardly through said opening, but not to allow coffee and hot water to pass upwardly through said opening, an outlet chamber, a porous separator and filter mounted between said brewing chamber and said outlet chamber, and said means for injecting air supplying air into said brewing chamber below said piston and above said porous separator and filter.

* * * * *